US010678297B2

(12) United States Patent
Toutant et al.

(10) Patent No.: US 10,678,297 B2
(45) Date of Patent: Jun. 9, 2020

(54) CIRCUIT COMMUNICATION SYSTEMS WITH DIGITAL STATE DEVICES

(71) Applicant: Ciena Corporation, Hanover, MD (US)

(72) Inventors: Roger Paul Toutant, Kanata (CA); Richard Murray Wyatt, Kanata (CA); Baskaran Soosaithasan, Kanata (CA)

(73) Assignee: Ciena Corporation, Hanover, MD (US)

( * ) Notice: Subject to any disclaimer, the term of this patent is extended or adjusted under 35 U.S.C. 154(b) by 216 days.

(21) Appl. No.: 15/976,417

(22) Filed: May 10, 2018

(65) Prior Publication Data

US 2019/0346879 A1 Nov. 14, 2019

(51) Int. Cl.
*G06F 1/00* (2006.01)
*G06F 1/14* (2006.01)

(52) U.S. Cl.
CPC ..................... *G06F 1/14* (2013.01)

(58) Field of Classification Search
CPC .......................................... G06F 1/14
USPC .......................................... 713/600
See application file for complete search history.

(56) References Cited

U.S. PATENT DOCUMENTS

| | | | | |
|---|---|---|---|---|
| 2011/0087914 A1* | 4/2011 | Files | ................ | G06F 13/4291 713/600 |
| 2013/0198428 A1* | 8/2013 | Kreuzer | ................ | G06F 13/36 710/110 |
| 2014/0348182 A1* | 11/2014 | Chandra | ................ | H04J 3/0697 370/503 |
| 2016/0147588 A1* | 5/2016 | Makipaa | ................ | G06F 11/0757 714/34 |
| 2016/0147684 A1* | 5/2016 | Sengoku | ................ | G06F 13/24 710/105 |
| 2016/0294544 A1* | 10/2016 | Jang | ................ | H04L 7/048 |
| 2017/0041688 A1* | 2/2017 | Pitigoi-Aron | ................ | G06F 1/12 |
| 2017/0041897 A1* | 2/2017 | Pitigoi-Aron | ................ | H04W 56/0015 |
| 2017/0231508 A1* | 8/2017 | Edwards | ................ | A61B 5/02055 600/301 |
| 2018/0224887 A1* | 8/2018 | Pitigoi-Aron | ................ | G06F 13/24 |
| 2018/0260357 A1* | 9/2018 | Amon | ................ | G06F 13/4291 |
| 2018/0285292 A1* | 10/2018 | Amarilio | ................ | G06F 13/24 |
| 2019/0332137 A1* | 10/2019 | Benjamini | ................ | G06F 1/12 |

OTHER PUBLICATIONS

NXP Semiconductors, "UM10204 I²C-bus Specification and User Manual", Apr. 4, 2014, Version 6.0.

* cited by examiner

*Primary Examiner* — Aurel Prifti
(74) *Attorney, Agent, or Firm* — Clements Bernard Walker; Christopher L. Bernard; Lawrence A. Baratta, Jr.

(57) ABSTRACT

A digital state device may include a first circuit terminal that obtains a clock signal from a first integrated circuit. The digital state device may further include a second circuit terminal that transmits the clock signal to a second integrated circuit. The digital state device may further include digital logic circuitry coupled to the first circuit terminal and the second circuit terminal. In response to obtaining an in-band notification signal in reverse of the clock signal and from the second integrated circuit, the digital logic circuitry sets the clock signal to a first predetermined value. In response to the digital logic circuitry determining that the clock signal exceeds a predetermined amount of time at the first predetermined value, the digital logic circuitry sets the clock signal to a second predetermined value that is different from the first predetermined value.

20 Claims, 6 Drawing Sheets

CIRCUIT COMMUNICATION SYSTEMS WITH DIGITAL STATE DEVICES

BACKGROUND

In the field of electronics, there are a number of designs for data transfers and transmitting commands between circuit devices. The Inter-Integrated Circuit (I2C) (also called "Inter-Inter Chip" and "I²C") protocol has become widely adopted as an inexpensive means to provide data transfers between various circuit devices.

SUMMARY

In general, in one aspect, embodiments relate to a digital state device. The digital state device includes a first circuit terminal that obtains a clock signal from a first integrated circuit. The digital state device further includes a second circuit terminal that transmits the clock signal to a second integrated circuit. The digital state device further includes a digital logic circuitry coupled to the first circuit terminal and the second circuit terminal. In response to obtaining an in-band notification signal in reverse of the clock signal and from the second integrated circuit, the digital logic circuitry sets the clock signal to a first predetermined value. In response to the digital logic circuitry determining that the clock signal exceeds a predetermined amount of time at the first predetermined value, the digital logic circuitry sets the clock signal to a second predetermined value that is different from the first predetermined value.

In general, in one aspect, embodiments relate to a circuit device. The circuit device includes an integrated circuit and a first circuit terminal coupled to the integrated circuit. The first circuit terminal transmits a clock signal to a digital state device. The clock signal is disposed at a first predetermined value and a second predetermined value that is different from the first predetermined value. The circuit device further includes a second circuit terminal coupled to the integrated circuit. The second circuit terminal transmits a data signal to the digital state device. In response to the clock signal exceeding a predetermined amount of time at the first predetermined value, the first circuit terminal obtains a notification signal from the digital state device notifying the integrated circuit that the clock signal is set to the second predetermined value.

In general, in one aspect, embodiments relate to a circuit device. The circuit device includes an integrated circuit and a first circuit terminal coupled to the integrated circuit. The first circuit terminal obtains a clock signal from a digital state device. The clock signal is disposed at a first predetermined value and a second predetermined value that is different from the first predetermined value. The circuit device further includes a second circuit terminal coupled to the integrated circuit. The second circuit terminal obtains a data signal from the digital state device. The integrated circuit transmits a notification signal that causes the digital state device to set the clock signal to the first predetermined value. In response to exceeding a predetermined amount of time after setting the clock signal to the first predetermined value, the first circuit terminal obtains the clock signal from the digital state device at the second predetermined value.

Other aspects and advantages of the invention will be apparent from the following description and the appended claims.

BRIEF DESCRIPTION OF DRAWINGS

Specific embodiments of the invention will now be described in detail with reference to the accompanying figures. Like elements in the various figures are denoted by like reference numerals for consistency.

DETAILED DESCRIPTION

Figure 1:
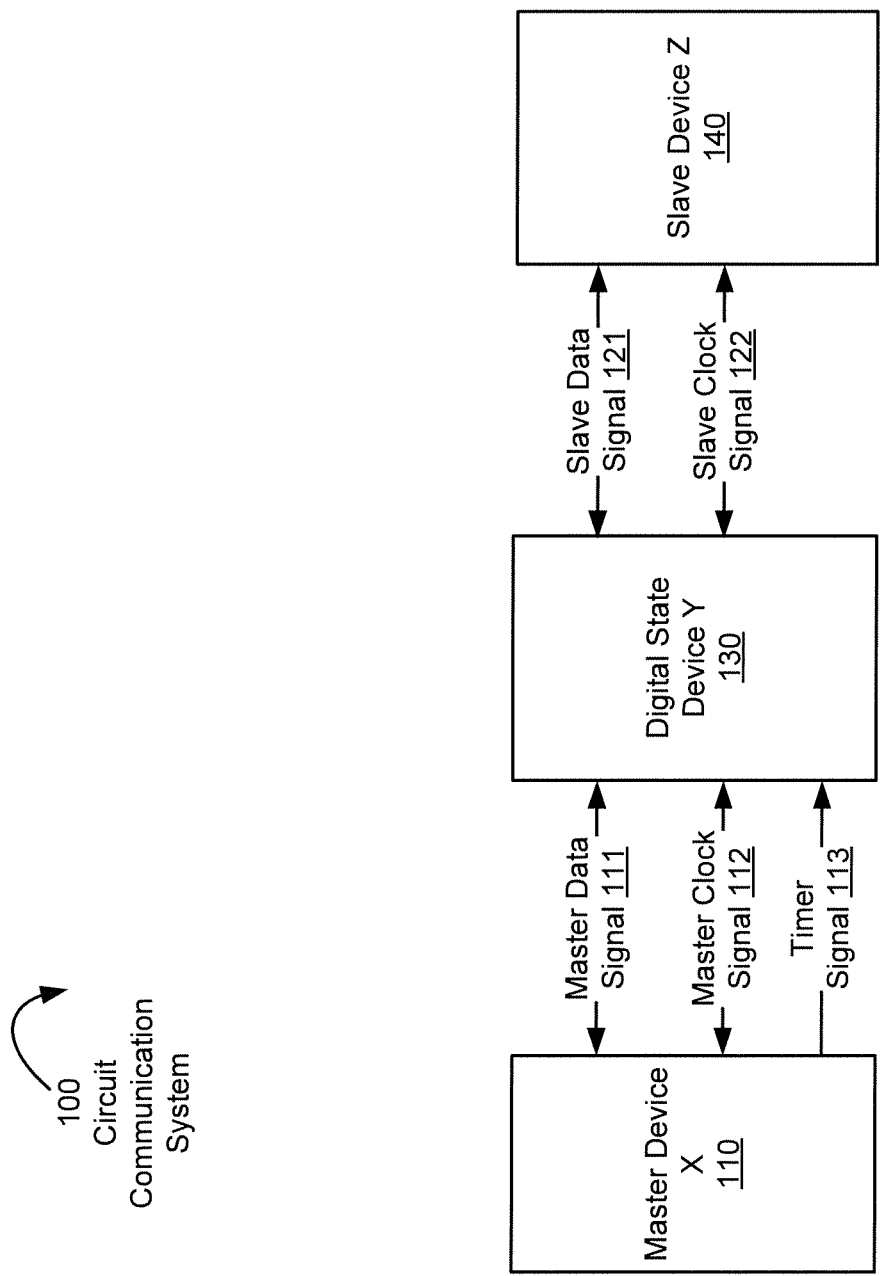
FIGS. 1, 2, and 3 show schematic diagrams of various systems in accordance with one or more embodiments.

In the following detailed description of embodiments of the invention, numerous specific details are set forth in order to provide a more thorough understanding of the disclosed technology. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the present disclosed technology include a system that includes various circuit devices, such as a master device and a slave device, coupled to a digital state device. For example, a master device may be a microprocessor that seeks to obtain data from a slave device, such as a pluggable optical device. In particular, one or more embodiments are directed to a digital state device that initiates an in-band clock stretching event in response to obtaining a notification signal. For example, if the slave device needs to reduce the data rate of a data transfer from the master device, the slave device may transmit a notification signal over a serial line, such as a clock signal line, to pause the data transfer. However, the system may malfunction where the data transfer fails to become unpaused by a malfunctioning slave device.

In some embodiments, the digital state device implements preemptive clock stretching to override a malfunctioning clock stretching event. In one embodiment, for example, a digital state device uses a timer circuit to detect passage of a predetermined amount of time when the clock stretching event expires. Based on the expiration, the digital state device may return control of clock signal in the system to the master device. The master device may then have control of a clock signal value to proceed with the data transfer, e.g., by setting the clock signal back to a logical high value.

In contrast, without preemptive clock stretching, some circuit communication systems address this problem by inserting analog switches between master devices and slave devices. An analog switch may isolate malfunctioning circuit devices, or permit a circuit device to only connect to the same master device with a common system address. Specifically, the analog switch may be a pass transistor that provides for bidirectional signal operation in the circuit communication system. With pass transistors, either a master device or a slave device can pull a serial data line and serial clock line to a logical low value. However, the switch functionality of an analog switch may not work for a digital device. For example, if digital logic in a digital device pulled a slave data signal low when a master data signal was low, and conversely pulled the master data signal low when a slave data signal was low, then the circuit communication system may malfunction. In particular, the master data signal and the clock data signal might remain in a "latched low condition" indefinitely with no means of reversal.

FIG. 1 shows a schematic diagram of a system in accordance with one or more embodiments. As shown in FIG. 1, a circuit communication system (e.g., circuit communication system (100)) may include a master device (e.g., master device X (110)) and a slave device (e.g., slave device Z (140)). In particular, a master device may be a circuit device that includes hardware and/or software with functionality to generate a clock signal (e.g., master clock signal (112), slave clock signal (122)) for transmission to a slave device. The clock signal may be an electrical signal that includes functionality for managing bits within a data signal (e.g., master data signal (111), slave data signal (121)). A slave device may be a circuit device that includes hardware and/or software with functionality to participate in a circuit transaction initiated by a master device. For example, a circuit device may be a master device in one circuit transaction and a slave device in a different circuit transaction. In some embodiments, a master device and/or a slave device is a computing system similar to the computing system (600) described below in FIG. 6 and the accompanying description.

Furthermore, in a circuit transaction, a master device may obtain data over a data signal (e.g., master data signal (111), slave data signal 121)) from the slave device or transmit data over the data signal to the slave device. As such, a circuit transaction may be provided over a master-slave link that includes the clock signals (112, 122) and the data signals (111, 121), where both sets of signals may be bidirectional signals, e.g. a notification signal in reverse of a clock signal that drives a circuit transaction. Moreover, clock signals and/or data signals may be binary signals that are pulled to logical high value corresponding to '1' or a logical low value corresponding to '0'. The actual physical values corresponding to the logical high and low values may not be fixed values and may instead depend on the types of components, such as choice of transistors and voltage power supplies, that implement the circuit communication system.

In some embodiments, a circuit communication system includes a digital state device (e.g., digital state device Y (130)) coupled to a master device (e.g., master device X (110)) and a slave device (e.g., slave device Z (140)). Specifically, a digital state device may include hardware and/or software that includes functionality to transmit data signals and/or clock signals between a master device and a slave device. In one embodiment, for example, a digital state device is a field programmable gate array. For example, the digital state device Y (130) may include digital logic circuitry (not shown) that includes functionality to implement various clock states based on the clock signals (112, 122) and/or data states based on the data signals (111, 121). Clock states are described in FIG. 4 below and the accompanying description. Data states are described in FIG. 5 below and the accompanying description.

Moreover, a communication protocol operating over the circuit communication system (100) may allow a slave device (e.g., slave device Z (140)) to "hold-off" or force a master device (e.g., the master device X (110)) to wait during a clock stretching event. For example, in an in-band clock stretching event within a circuit transaction, the slave device Z (140) may pull a clock signal line to a logical low value to pause a circuit transaction. As such, when the master device X (110) detects after the release of the master clock signal (112) that the signal (112) remains low, the master device X (110) may not resume the circuit transaction until the slave device Z (140) also allows the clock signals (112, 122) to return to a different clock value, e.g., a logical high value.

With respect to a digital state device configured to enable a clock stretching event, the digital state device may include functionality to obtain an in-band notification signal from a slave device that triggers a respective clock stretching event. Here, a digital state device may pause a circuit transaction for a predetermined amount of time upon receipt of the notification signal. The notification signal may be an electrical signal similar to a data signal or clock signal that is transmitted over a clock line or data line. During a clock stretching event, the digital state device may designate a clock signal with a predetermined clock value, e.g., a logical low value, until the clock stretching event ends. In another example, a slave device may transmit a notification signal to the digital state device that terminates the clock stretching event. As such, the digital state device may return the clock signal to a logical high value that causes the circuit transaction to proceed accordingly.

Keeping with FIG. 1, a clock stretching event may occur when a slave device cannot process a circuit transaction at the same rate as the data transfer rate of the data signal. For example, a slave device may need additional time to write data of the data transfer to a register. Thus, the slave device may trigger a clock stretching event in order to slow down the clock signal at the digital state device and extend a particular clock period of the clock signal.

In some embodiments, a digital state device includes functionality to implement preemptive clock stretching. With preemptive clock stretching, an opportunity may be afforded the digital state device to determine whether a slave device has initiated a clock stretching event and if the event has exceeded any predetermined parameters, e.g., has the clock stretching event exceeded a maximum time limit or a specific clock period. In some embodiments, a digital state device includes one or more timer circuits that includes hardware and/or software with functionality to detect and monitor the clock stretching event to determine whether a timeout has occurred for the event, e.g., the event has exceeded a specified amount of time. When a timeout occurs, a digital state device may terminate the clock stretching by returning the clock signal to a logical high value. Thus, a digital state device may override clock stretching initiated by a slave device to proceed with a data transfer for a circuit transaction. Accordingly, the circuit transaction may proceed with the next clock period and transmission of the next portion of the data signal.

Without preemptive clock stretching, a circuit communication system may need to implement a secondary master device for slave devices, or implement unidirectional clock signals that disallow clock stretching. Disallowing clock stretching may also require implementing decoding logic with respect to a circuit communication protocol that provides for clock stretching. Terminating a secondary master device may also involve additional logic resources in the digital state device. Thus, various workarounds to clock stretching may preclude many types of slave devices, e.g., I2C specific slave devices. For more information on I2C slave devices and I2C master devices in accordance with one or more embodiments, see "UM10204 I²C-Bus Specification and User Manual", published on Apr. 4, 2014 by NXP Semiconductors®, which is incorporated herein by reference.

In another embodiment, a timeout is determined using a timer signal (e.g., timer signal (113)). For example, one or more timer signals may be transmitted to the digital state device from a master device. The timer signals may be transmitted separately from the data signals and/or clock signals provided in a bus protocol operating the circuit communication system (100). For example, a timer signal may be transmitted via an interface such as a serial peripheral interface (SPI) or a peripheral component interconnect express (PCIe) interface.

Moreover, the timer signal may correspond to a timer for a low period of a clock signal line (hereinafter "SCL Low Timer") or a timer for a circuit transaction (hereinafter "transaction timeout timer"). The low period of a clock signal line (hereinafter "SCL low period") corresponds to the low period of the clock signal line implemented by a master device using a bus protocol. In some embodiments, the transaction timeout timer is used by a digital state device to limit the period of a clock stretching event. In particular, the timer signal may include information regarding the starting time and/or ending time of a clock period that limits a clock stretching event. In another embodiment, the timer signal may be a notification signal identifying a timeout. The timer signal may be transmitted over a data line or a clock line in a reverse direction between the master device and the digital state device, e.g., as part of a clock signal and/or a data signal.

In some embodiments, the digital state device independently determines a timeout without obtaining timer information from a master device. For example, the digital state device may store locally a predetermined amount of time value for a clock period and then count down the amount of time after a clock stretching event is initiated. In one embodiment, for example, the amount of time for an SCL Low period may be preloaded onto the digital state device at an initial device configuration or before a circuit transaction begins.

Figure 2:
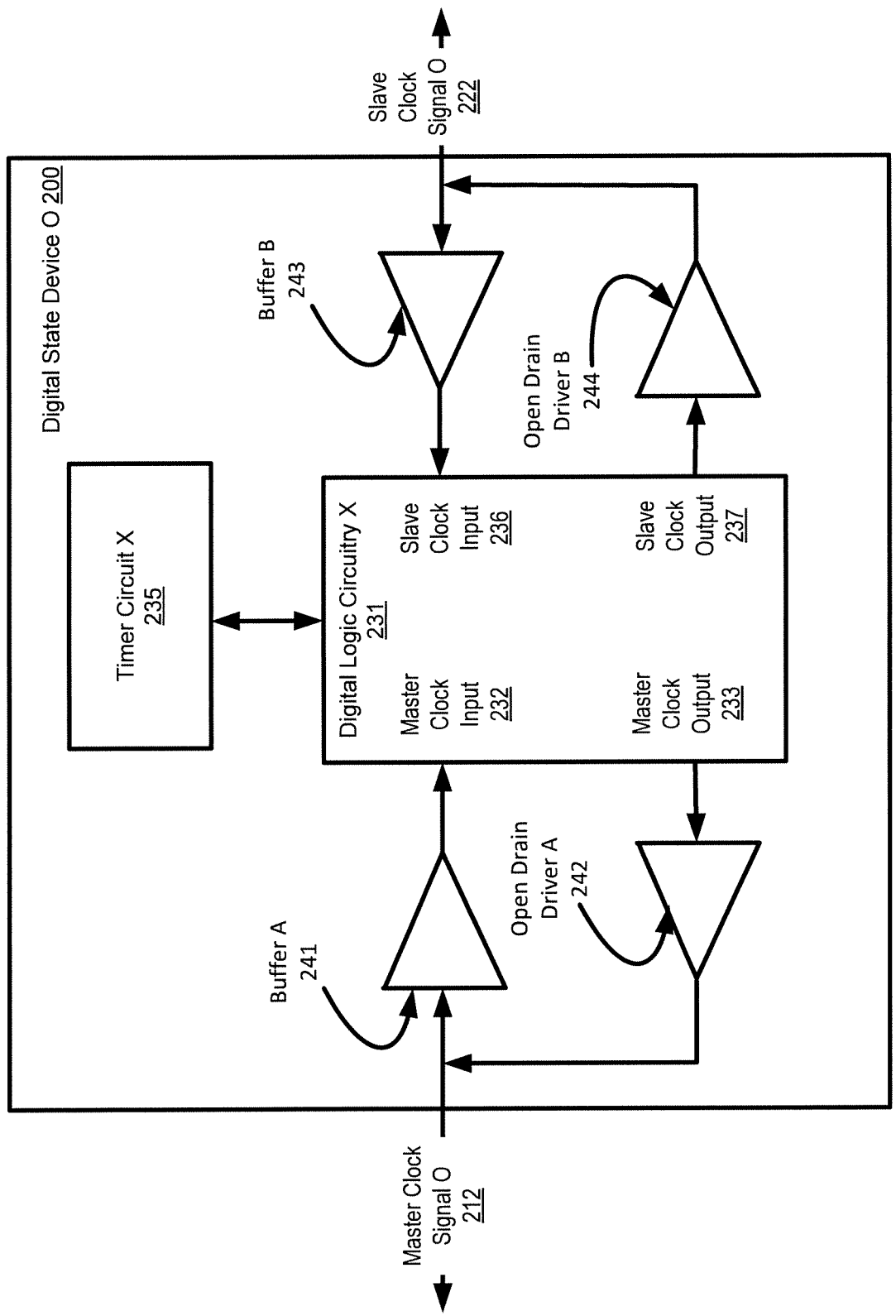

Turning to FIG. 2, FIG. 2 shows a schematic diagram of an example digital state device. The following example is for description purposes only and not intended to limit the scope of the invention. As shown in FIG. 2, a digital state device O (200) includes digital logic circuitry X (231) coupled to a timer circuit X (235). For example, digital logic circuitry, such as the digital logic circuitry X (231), may include functionality to determine one or more clock states and/or data states in response to a timeout detected by the timer circuit X (235).

In some embodiments, a digital state device includes various transistors (e.g., buffer A (241), open drain driver A (242), buffer B (243), open drain driver B (244)) to administer input and output signals (e.g., master clock signal O (212), slave clock signal O (222)). For example, the digital logic circuitry X (231) may include a master clock input (232) (also called "MC_IN") coupled to buffer A (241) for obtaining an input signal from a master device. The buffer A (241) may operate as an input buffer for a signal transmitted to master clock input (232). Likewise, when the digital state device O (200) transmits an output signal to the master device, the digital logic circuitry X (231) may transmit an output signal from master clock output (233) (also called "MC_O") to open drain driver A (242). Thus, the open drain driver A (242) may operate as an output driver that administers a serial clock line and the clock signal that is detected by the master device. In other words, the open drain driver A (242) may set a corresponding serial clock line to different clock values, e.g., a logical low or a logical high value.

Keeping with FIG. 2, the digital logic circuitry X (231) includes a slave clock input (236) (also called "SC_IN") coupled to a buffer B (243) and a slave clock output (237) (also called "SC_O") coupled to an open drain driver B (244). Accordingly, similar to input and output configuration for the master clock signal O (212), the slave clock signal O (222) may be a bidirectional signal where the digital logic circuitry X (231) communicates input and output signals with a slave device. While open drain drivers are shown in FIG. 2, in other embodiments, other transistors and circuit components may be used to implement bidirectional signaling between a digital state device and a master device and/or a slave device. For example, various open collector devices, push-pull devices, and/or common collector devices may be implemented along with and/or in place of open drain drivers.

Figure 3:
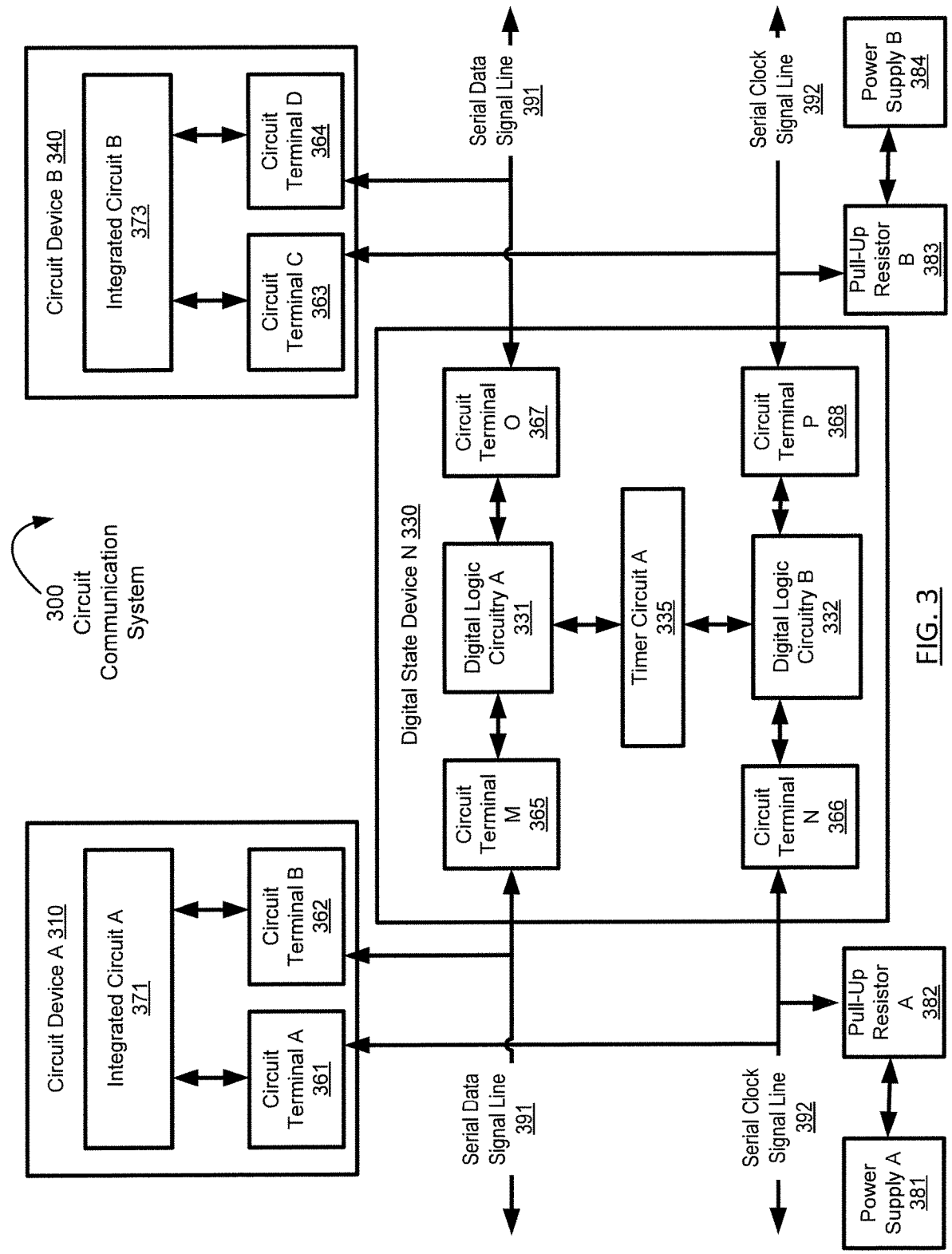

Turning to FIG. 3, FIG. 3 shows a schematic diagram of a system in accordance with one or more embodiments. As shown in FIG. 3, a circuit communication system (e.g., circuit communication system (300)) may include various circuit devices (e.g., circuit device A (310), circuit device B (340)) coupled to one or more digital state devices (e.g., digital state device N (330)). For example, a circuit device may include one or more integrated circuits (e.g., integrated circuit A (371), integrated circuit B (373)) coupled to various circuit terminals (e.g., circuit terminal A (361), circuit terminal B (362), circuit terminal C (363), circuit terminal D (364)). Circuit terminals may include hardware where a conductor from a circuit device ends and connects to an external circuit (e.g., serial data signal line (391), serial clock signal line (392)). Examples of circuit terminals may include pins and other types of electrical connectors. Likewise, examples of integrated circuits that interact over the circuit communication system (300) may include microprocessors, a clock generation chip, pluggable optical devices, memory devices, sensor devices, display drivers, etc.

Furthermore, a circuit communication system may include a system bus that connects multiples circuit devices and provides data transfers using a bus protocol, such as the I2C bus protocol. In particular, the circuit communication system (300) may be located inside a computing system similar to computing system (600) described in FIG. 6 and the accompanying description. Moreover, a circuit communication system may include multiple serial lines, such as a serial data line (e.g., serial data signal line (391)) and a serial clock signal line (e.g., serial clock line (392)). For example, a serial data signal line may include hardware for transmitting one or more data signals between different circuit devices. Likewise, a serial clock line may include hardware for transmitting one or more clock signals between different circuit devices. Serial lines may include lines used by switches, multiplexers, repeaters, extenders, hubs, and other components not shown for relaying electrical signals, such as data signals, clock signals, and timer signals, across a circuit communication system.

Keeping with FIG. 3, circuit device A (310) may be a master device while circuit device B (340) may be a slave device, while in some embodiments, circuit device A (310) is a slave device and circuit device B (340) is the master device. For example, circuit device A (310) may be similar to master device X (110) and circuit device B (340) may be similar to slave device Z (140) described above in FIG. 1 and the accompanying description. As shown in FIG. 3, the digital state device N (330) may be coupled to both circuit devices (310, 340). As such, the digital state device N (330)

may include multiple circuit terminals (i.e., circuit terminal M (365), circuit terminal O (367), circuit terminal N (366), circuit terminal P (368)) coupled to the serial data line (391) and the serial clock line (392), respectively. At the circuit terminals (365, 367), the digital state device N (330) may obtain and/or transmit data signals and other signals to the circuit devices (310, 340). Similarly, at the circuit terminals (366, 368), the digital state device N (330) may obtain and/or transmit clock signals and other signals to the circuit devices (310, 340).

Keeping with the digital state device N (330), the digital state device N (330) may include multiple digital logic circuitries (i.e., digital logic circuitry A (331), digital logic circuitry B (332)). The digital logic circuitry A (331) may be hardware and/or software that includes functionality to implement one or more data states based on data signals. For more information on data states, see FIG. 5 and the accompanying description below. The digital logic circuitry B (332) may be hardware and/or software that includes functionality for implementing one or more clock states based on clock signals, clock stretching events, and/or preemptive clock stretching. For example, the digital logic circuitries (331, 332) may be coupled to timer circuit A (335) in order to determine different data states and/or clock states based on a detected timeout with respect to a clock stretching event. Also, while a single digital state device is shown in FIG. 3, in other embodiments, multiple digital state devices may be implemented in a circuit communication system. Digital state devices may be implemented on separate serial lines, i.e. one device for the serial data line and another device for the serial clock line.

Figure 4:
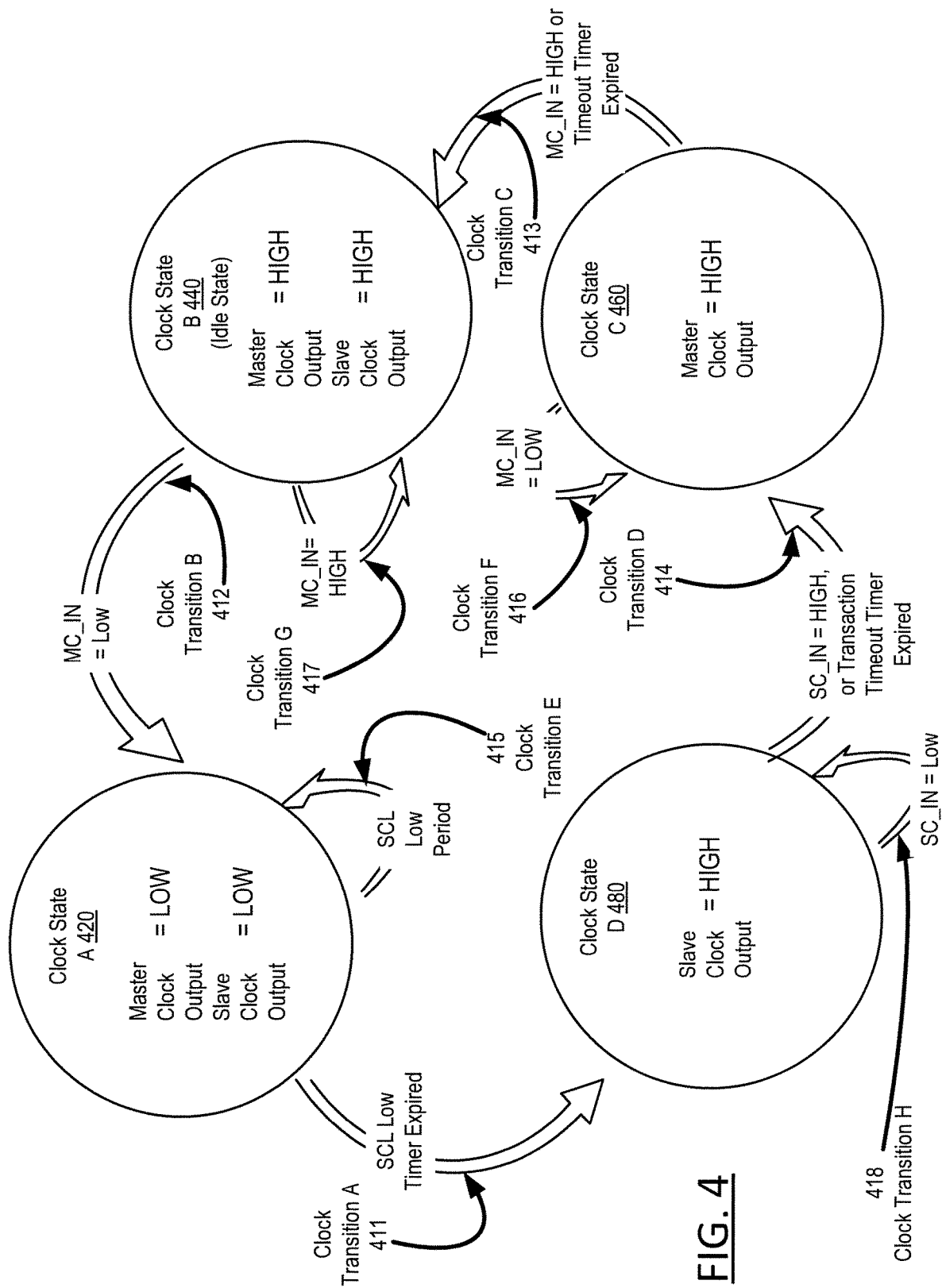
FIGS. 4 and 5 show examples of state diagrams in accordance with one or more embodiments.

Turning to FIG. 4, FIG. 4 shows an example of a clock state diagram for a digital state device in accordance with one or more embodiments. The following example is for description purposes only and not intended to limit the scope of the invention. As shown in FIG. 4, digital logic for a digital state device may correspond to different clock states (i.e., clock state A (420), clock state B (440), clock state C (460), clock state D (480)). First, at clock state B (440), the digital state device is in an idle state where both a master clock signal and a slave clock signal are both at logical high values. With respect to the digital state device, a master clock output and a slave clock output are also disposed at logical high values. At clock transition B (412), the master clock signal changes to a logical low value detected by a master clock input.

At clock state A (420), the digital state device drives the master clock output and the slave clock output to logical low values. The digital state device remains in clock state A (420) for a predetermined amount of time that defines a clock stretching event, i.e., as illustrated by clock transition E (415). For example, the predetermined amount of time may correspond to an SCL low period. When a timer circuit detects the amount of time has been exceeded, for example, the digital state device proceeds to clock state D (480) over clock transition A (411).

Keeping with FIG. 4, at clock state D (480), the digital state device waits for a notification signal from the slave device to terminate a clock stretching event. While waiting, the slave clock output in the digital state device is driven to a logical high value. As shown in clock transition H (418), a slave device may transmit a logical low value to the digital state device using the slave clock input, i.e., as the notifications signal, to continue the clock stretching event. Thus, the slave device notifies the digital state device to continue a clock stretching event in order to acquire possession of the slave clock line.

In clock transition D (414), a slave device notifies the digital state device that the clock stretch event is finished using slave clock input. As such, the digital state device may also detect a timeout if no notification is received. At clock state C (460), the digital state device notifies the master device that the clock stretching event has expired using master clock output. As shown in clock transition F (416), the digital state machine stays in clock state C (460) while the digital state device waits for the master device to reacquire possession of the master clock line, i.e., by driving the clock signal to logical high as detected at the master clock input. At clock transition C (413), the digital state device detects a logical high value at the master clock input or a timeout expiration. Accordingly, the digital state device may return to an idle state, i.e., clock state B (440), and stays there per clock transition G (417) while the master clock input remains at a logical high value.

Returning to FIG. 3, a circuit communication system may include various pull-up resistors (e.g., pull-up resistor A (382), pull-up resistor B (383)) coupled to one or more serial lines, power supplies (e.g., power supply A (381), power supply B (384)), and circuit devices (e.g., circuit device A (310), circuit device B (340)). For example, when no circuit transactions are operating on the circuit communication system (300), the pull-up resistors may set the serial clock line to a logical high value using the power supplies (381, 384). When a master device initiates a circuit transaction over the circuit communication system (300), the master device may use one or more corresponding pull-up resistors to obtain control over the serial lines (391, 392), e.g., through arbitration in the I2C protocol. Likewise, both circuit devices (310, 340) may include functionality for pulling signals along both serial lines (391, 392) to a logical high value or a logical low value, e.g., using open drain transistors. In some embodiments, current sources are used in place of pull-up resistors. While the pull-up resistors (382, 383) are shown outside the digital state device, in some embodiments, various pull-up resistors are provided within one or more digital state devices.

While the circuit communication system (300) is described with respect to one master device, in some embodiments, multiple master devices and/or multiple slave devices may be implemented in a circuit communication system.

Figure 5:
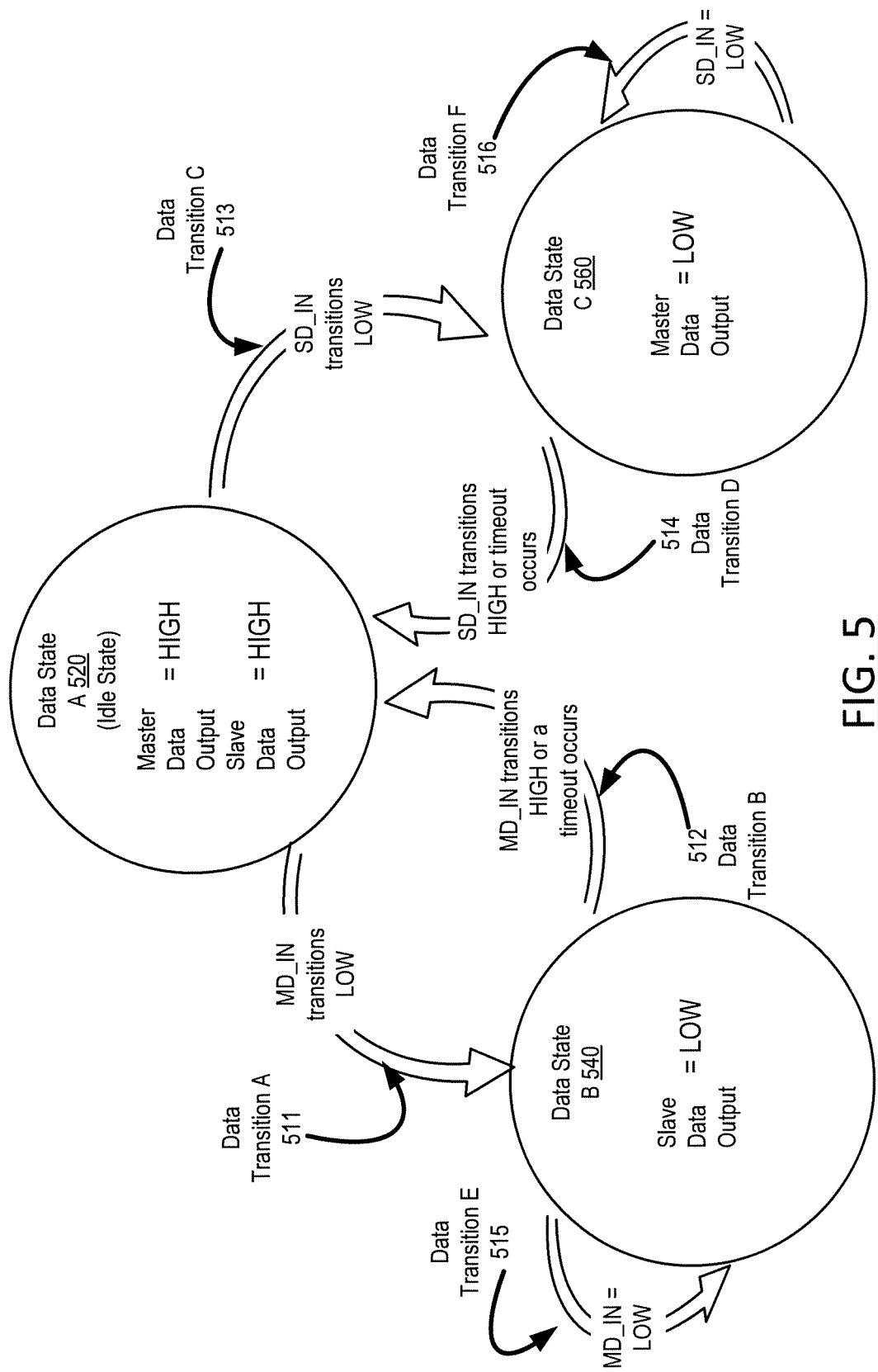

Turning to FIG. 5, FIG. 5 shows an example of a data state diagram for a digital state device in accordance with one or more embodiments. The following example is for description purposes only and not intended to limit the scope of the invention. As shown in FIG. 5, digital logic for a digital state device may correspond to different data states (i.e., data state A (520), data state B (540), data state C (560)).

First, at data state A (520), the digital state device is in an idle state where both a master data signal and a slave data signal are both at logical high values. As such, a master data output and a slave data output are also high. For example, a digital state device may include data inputs and data outputs similar to the master clock input, master clock output, slave clock input, and slave clock output described above in FIG. 2 and the accompanying description. At data transition A (511), the master data signal is at a logical low value that is detected by a master data input. At data state B (540), the digital state device drives the slave data output low. The digital state device remains in data state B (540) while the master data input has a logical low value, as shown in data transition E (515). At data transition B (512), the digital state device detects a logical high value at the master data input and proceeds to return to data state A (520) to idle. Likewise, the data transition B (512) may also correspond to a timeout for a transaction timeout timer.

At data transition C (513), the slave data signal becomes a logical low value where the digital state device detects the low value at the slave data input. From data transition C (513), the digital state device enters data state C (560) where the master data output is driven low. As such, the digital state device stays in data state C (560) while the slave data input is at logical low, i.e., over data transition F (516). At data transition (514), the digital state device detects slave data input as a logical high value or, a timeout expiration.

In some embodiments, where clock stretching is not implemented by a slave device, then the digital logic of a digital state device may employ a series of similar state machines as described above in FIG. 5 rather than the state machines as described above in FIG. 4 and the accompanying description.

Figure 6:
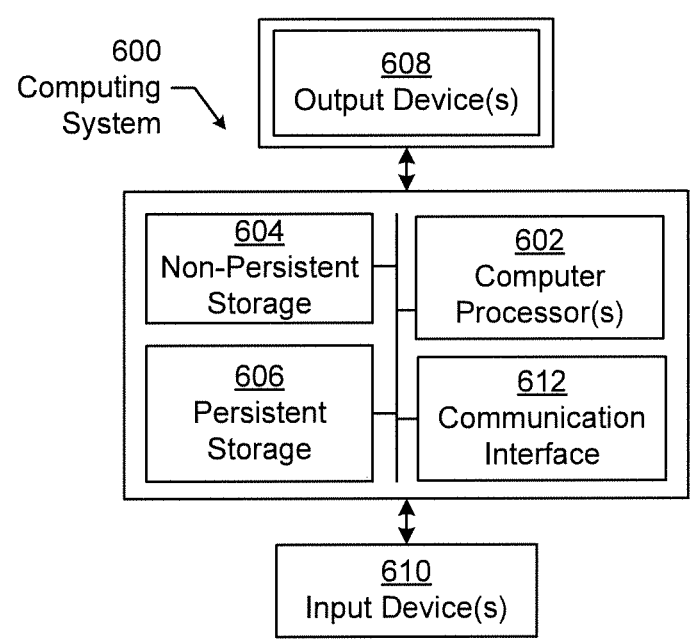
FIG. 6 shows a computing system in accordance with one or more embodiments.

Embodiments discussed herein may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system or group of computing systems described in FIG. 6 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, a data container (e.g., database, table, record, column, view, etc.), identifier(s), conditions (e.g., comparison operators), functions (e.g., join, full join, count, average, etc.), sort (e.g., ascending, descending), or others. The DBMS may execute the statement. For example, the DBMS may access a memory buffer, a reference or index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6. Other functions may be performed using one or more embodiments of the invention.

Embodiments disclosed herein provide pre-emptive clock stretching of the clock line on the master side in order to afford the digital device opportunity to determine if the slave is forcing the clock to "0", that is, stretching the clock. Embodiments discussed herein also provide a method for digital logic in the digital device to not only transfer data via a data line between master and slave(s), but also to transfer clock from master to slave(s) while supporting clock stretching by the slave(s) via pre-emptive clock stretching. Thus, a purely digital device is able to be inserted between a master I2C device and one or more slave I2C device(s).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A digital state device, comprising:
a first circuit terminal configured to obtain a clock signal from a first integrated circuit;
a second circuit terminal configured to transmit the clock signal to a second integrated circuit; and
a first digital logic circuitry coupled to the first circuit terminal and the second circuit terminal,
wherein, in response to obtaining an in-band notification signal in reverse of the clock signal and from the second integrated circuit, the first digital logic circuitry is configured to set the clock signal to a first predetermined value, and wherein, in response to the first digital logic circuitry determining that the clock signal exceeds a predetermined amount of time at the first predetermined value, the first digital logic circuitry is further configured to set the clock signal to a second predetermined value that is different from the first predetermined value.

2. The digital state device of claim 1,
wherein the first integrated circuit is a master device, and
wherein the second integrated circuit is a slave device.

3. The digital state device of claim 1,
wherein the second integrated circuit transmits the notification signal to initiate a clock stretching event, and
wherein the first digital logic circuitry sets the clock signal to the second predetermined value in order to perform preemptive clock stretching.

4. The digital state device of claim 1, further comprising:
a timer circuit configured to obtain a timer signal from the first integrated circuit, and
wherein the first digital logic circuitry is configured to determine that the clock signal exceeds the predetermined amount of time based on the timer signal.

5. The digital state device of claim 1,
wherein the first circuit terminal is configured to couple to a first pull-up resistor,
wherein the second circuit terminal is configured to couple to a second pull-up resistor, and
wherein the first pull-up resistor and the second pull-up resistor are configured to set the clock signal to the second predetermined value.

6. The digital state device of claim 1,
wherein the first predetermined value corresponds to a logical low value, and
wherein the second predetermined value corresponds to a logical high value.

7. The digital state device of claim 1, further comprising:
a plurality of open drain drivers comprising a first open drain driver coupled to the first circuit terminal and a second open drain driver coupled to the second circuit terminal, and
wherein the plurality of open drain drivers are configured to set the clock signal to the first predetermined value.

8. The digital state device of claim 1,
wherein the notification signal is a signal that is transmitted along a clock signal line in a system bus using a bus protocol.

9. The digital state device of claim 1, further comprising:
a third circuit terminal configured to obtain a data signal from the first integrated circuit;
a fourth circuit terminal configured to transmit the data signal to the second integrated circuit;
a second digital logic circuitry coupled to the third circuit terminal and the fourth circuit terminal, wherein the second digital logic circuitry is configured to transmit the data signal when the clock signal is at the second predetermined value.

10. A circuit device, comprising:
a first integrated circuit;
a first circuit terminal coupled to the first integrated circuit, the first circuit terminal configured to transmit a clock signal to a digital state device, wherein the clock signal is configured to be disposed at a first predetermined value and a second predetermined value that is different from the first predetermined value; and
a second circuit terminal coupled to the first integrated circuit, the second circuit terminal configured to transmit a data signal to the digital state device, wherein, in response to the clock signal exceeding a predetermined amount of time at the first predetermined value, the first circuit terminal is further configured to obtain a notification signal from the digital state device notifying the first integrated circuit that the clock signal is set to the second predetermined value.

11. The circuit device of claim 10, wherein the predetermined amount of time at the first predetermined value corresponds to an expiration of a clock stretching event.

12. The circuit device of claim 10, further comprising:
a third circuit terminal configured to transmit a timer signal to the digital state device, and
wherein the digital state device is configured to determine that the clock signal exceeds the predetermined amount of time based on the timer signal.

13. The circuit device of claim 10, wherein the first circuit terminal is configured to couple to a pull-up resistor, and
wherein the pull-up resistor is configured to set the clock signal to the second predetermined value.

14. The circuit device of claim 13, wherein the pull-up resistor is disposed inside the digital state device.

15. The circuit device of claim 10, wherein the data signal is configured to be transmitted to a second integrated circuit using a predetermined circuit address associated with the second integrated circuit, and
wherein the data signal corresponds to an Inter-Integrated Circuit (I2C) bus protocol signal.

16. The circuit device of claim 10, wherein the first integrated circuit is a microprocessor.

17. A circuit device, comprising:
a first integrated circuit;
a first circuit terminal coupled to the first integrated circuit, the first circuit terminal configured to obtain a clock signal from a digital state device, wherein the clock signal is configured to be disposed at a first predetermined value and a second predetermined value that is different from the first predetermined value; and
a second circuit terminal coupled to the first integrated circuit, the second circuit terminal configured to obtain a data signal from the digital state device,
wherein the first integrated circuit is configured to transmit a notification signal that causes the digital state device to set the clock signal to the first predetermined value, and
wherein, in response to exceeding a predetermined amount of time after setting the clock signal to the first predetermined value, the first circuit terminal is further configured to obtain the clock signal from the digital state device at the second predetermined value.

18. The circuit device of claim 17, wherein the first circuit terminal is configured to couple to a pull-up resistor, and
wherein the pull-up resistor is configured to set the clock signal to the second predetermined value.

19. The circuit device of claim 17, wherein the data signal corresponds to a circuit transaction between the first integrated circuit and a second integrated circuit that uses a predetermined circuit address associated with the first integrated circuit for the circuit transaction, and
wherein the data signal corresponds to an Inter-Integrated Circuit (I2C) bus protocol signal.

20. The circuit device of claim 17, wherein the first integrated circuit is a portion of a pluggable optical device.

* * * * *